United States Patent Office 3,790,635
Patented Feb. 5, 1974

3,790,635
PROCESS FOR THE PREPARATION OF
CANTHAXANTHINE
Jacques Morel, Lyon, France, assignor to Rhone-
Poulenc S.A., Paris, France
No Drawing. Original application Aug. 23, 1968, Ser. No.
754,996, now Patent No. 3,646,149. Divided and this
application June 18, 1971, Ser. No. 154,612
Int. Cl. C07c 45/04, 49/36
U.S. Cl. 260—586 B                9 Claims

ABSTRACT OF THE DISCLOSURE

Canthaxanthine, useful as a coloring agent for foods, may be made by oxidizing β-carotene or retrodehydro-β-carotene with a metaperiodate and, as catalyst, a metal oxide of Group V–A, VI–A, VII–A, or VIII of the Periodic Table.

CROSS-REFERENCE TO RELATED APPLICATION

This application is a divisional of my application Ser. No. 754,996, filed Aug. 23, 1968, now Pat. No. 3,646,149.

The present invention relates to the preparation of canthaxanthine, or 4,4'-diketo-β-carotene, which has the formula given below of which, to simplify writing, only the terminal groups are reproduced:

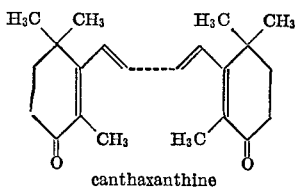

canthaxanthine

Canthaxanthine is a coloring matter belonging to the carotenoid family. It is non-toxic and has a high degree of stability in air. It is thus particularly suitable for coloring foodstuffs, especially those intended for dietetic use.

The various processes of direct synthesis of canthaxanthine which have hitherto been proposed require numerous intermediate stages and give only mediocre yields of the final product.

It has also been proposed to obtain canthaxanthine by oxidation of β-carotene, which is easily accessible, for example by fermentation of maize or of soya oil. This oxidation can, for example, be carried out, as described in United States patent specification No. 2,871,267, by the action of N-bromosuccinimide on β-carotene in an alcohol-chloroform mixture. The reaction yields various oxidation derivatives of β-carotene and the yield of canthaxanthine is unfortunately very low.

The present invention provides a new process for the preparation of canthaxanthine which comprises contacting β-carotene or retrodehydro-β-carotene with ammonium or an alkali metal metaperiodate, in the presence of, as catalyst, a halogen or of an oxide of a metal of Group V–A, VI–A, VII–A, and VIII of the Periodic Table of the elements as adopted by the Societe Chimique de France.

This process makes it possible very easily to obtain pure canthaxanthine in yields which are markedly greater than those obtained hitherto by oxidation of β-carotene. In the new process, a minimum of 4 molecules of metaperiodate are used per 1 mol of β-carotene or retrodehydro-β-carotene, which have the formulae given below, of which, to simplify writing, only the terminal groups are given:

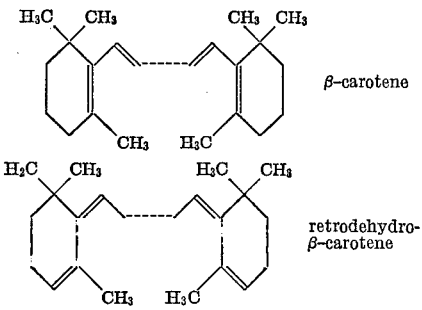

Although an excess of metaperiodate can be advantageous it must nevertheless be understood that it should be kept within reasonable limits because a point is reached where additional quantities of metaperiodate have no significant effect. Preferred amounts of metaperiodate are from 4 to 10 molecules has 1 mol of β-carotene are retrodehydro-β-carotene.

β-Carotene or retrodehydro-β-carotene should be oxidized in a diluted form. Any diluent which is inert under the process conditions and capable of being removed from the reaction medium without requiring too high a temperature—of the order of 60° C. maximum to avoid thermal degradation of the canthaxanthine—may be used for this purpose. The chlorinated lower aliphatic hydrocarbons such as chloroform are particularly suitable.

The metaperiodate is preferably added dissolved in a solvent which is neutral towards the reaction, for example water.

The catalyst used is, as already stated, a halogen, e.g. bromine or iodine, or an oxide of a metal of Group V–A, VI–A, VII–A, or VIII of the Periodic Table. Suitable oxides are tungsten trioxide, vanadium pentoxide, moylbdenum trioxide, and osmium tetroxide. The amount of catalyst employed may be from between 0.1% to 10%, preferably from 0.5 to 5%, by weight of the substance to be oxidized. The catalyst may be added in the pure state or dissolved in an inert solvent. This solvent is preferably a halogenated or non-halogenated volatile aliphatic hydrocarbon, a volatile benzene hydrocarbon, an aliphatic ether or an ester of low boiling point. More generally, all neutral solvents which can be removed by a process which does not require prolonged heating of the canthaxanthine to a temperature above 60° C. are suitable, as has been stated above.

When iodine is employed to catalyze the reaction it may be introduced in the pure state, in solution, or generated in situ. For this purpose, it is possible to use the oxidizing power of the metaperiodate present in the medium, adding hydriodic acid or ametallic iodide to liberate the desired amount of iodine. It will be obvious that in this case the amount of metaperiodate used corresponds to that chosen for the oxidation of the β-carotene or retrodehydro-β-carotene, increased by the fraction intended for the generation of the iodine.

The concentration of the β-carotene or retrodehydro-β-carotene in the reaction medium is not critical but it has been found that the best results are generally obtained if this concentration is low, that is to say from 0.1% to 3%, preferably from 0.4% to 0.9%, these figures being expressed in weights for volume.

The temperature at which the oxidation is carried out is preferably rather low and the range of −5° C. to 25° C. is perfectly suitable. In the majority of cases the optimum temperature is from 0° C. to 5° C.

The reaction yield may be improved by adding a small proportion of a volatile alcohol and more particularly of a lower alkanol such as ethanol. It is generally sufficient to introduce at most 2% and at least 0.1% by volume of ethanol in order to achieve maximum effectiveness.

The end of the reaction may be detected by a thin layer chromatography. This operation is carried out by depositing about 2 microlitres of the reaction solution on a 0.250 mm. thick silica gel plate, using a mixture of petroleum ether/benzene/ethanol, of volume composition 50/50/5, as the solvent. The reaction is considered to be finished when the chromatogram only shows a spot with an $R_F$ identical to that of canthaxanthine.

When the end of the reaction has been reached it is preferable to add a small quantity of an alkaline base to prevent secondary reactions developing.

In practice, the process according to the invention may be carried out as follows. The β-carotene or retrodehydro-β-carotene and the diluent are stirred at the temperature selected for the reaction and the catalyst and the metaperiodate are then added. When the reaction is finished the alkaline base is added and the organic phase is decanted, washed and dried. The canthaxanthine may be separated from the reaction mixture by the usual method of separation of the constituents of a mixture. For example, the solvents can be removed by distillation under reduced pressure and the canthaxanthine then isolated by recrystallization.

The following examples illustrate the invention.

EXAMPLE 1

5 g. of β-carotene and 850 cm.³ of chloroform containing 0.5% by volume of ethanol are introduced into a 2-litre flask equipped with a mechanical stirrer, a thermometer and a dropping funnel, the flask being kept under an atmosphere of nitrogen. The stirred mixture is cooled to 2° C. and 50 cm.³ of chloroform containing 50 mg. of dissolved iodine are added. 8 g. of sodium metaperiodate are added as a solution in 60 cm.³ of water over the course of 1 hour 30 minutes, and the mixture is then kept at 2° C. with stirring for 1 hour. This time is sufficient for thin layer chromatography practically no longer to show anything other than the canthaxanthine spot. 25 cm.³ of 2.5 N sodium hydroxide solution are then added and the organic layer is then decanted and twice washed with 25 cm.³ of water. After drying over sodium carbonate, the solution is filtered and the solvent evaporated without exceeding 40° C. in the material.

The residue is dissolved in 25 cm.³ of 1,2-dichloroethane, with gentle warming on a water bath, and 100 cm.³ of ethanol are then added. The mixture is cooled to 0° C., filtered, and the crystals are washed with 40 cm.³ of ethanol and dried under reduced pressure at ambient temperature (25° C.). 1.77 g. of pure canthaxanthine, M.P. 220–221° C., are thus obtained.

EXAMPLE 2

1 g. of retrodehydro-β-carotene and 100 cm.³ of chloroform containing 0.5% by volume of ethanol are introduced into a 250 cm.³ flask kept under an atmosphere of nitrogen and fitted with a mechanical stirrer, a thermometer and a dropping funnel. The mixture is cooled to 2° C., and 10 mg. of iodine are added followed by 1.6 g. of sodium metaperiodate, dissolved in 12 cm.³ of water, added over the course of 1 hour 30 minutes. The process is stopped at the end of 1 hour 30 minutes by adding 25 cm.³ of 2.5 N sodium hydroxide solution, and the organic phase is then worked up as in Example 1 to yield a residue which is dissolved in 5 cm.³ of 1,2-dichloroethane. After adding 20 cm.³ of ethanol, crystallizing at 0° C., washing the crystals with 10 cm.³ of ethanol, and drying under reduced pressure at 25° C., 0.3 g. of pure canthaxanthine, M.P. 220° C., are obtained.

EXAMPLE 3

1 g. of β-carotene and 175 cm.³ of chloroform containing 0.5% by volume of ethanol are introduced into a 500 cm.³ flask kept under a nitrogen atmosphere and fitted with a mechanical stirrer, a thermometer and a dropping funnel. The mixture is cooled to 2° C. and 47 cm.³ of a chloroform solution containing 1.34 g. of bromine per litre are added, followed, over the course of 2 hours, by 1.6 g. of sodium metaperiodate dissolved in 12 cm.³ of water. The process is interrupted after one hour's stirring at 2° C., by adding 25 cm.³ of 2.5 N sodium hydroxide solution.

Proceeding thereafter as in Example 2, 0.395 g. of canthaxanthine, M.P. 221–222° C., are obtained.

EXAMPLE 4

1 g. of β-carotene and 100 cm.³ of chloroform containing 0.5% by volume of ethanol are introduced into the apparatus described in Example 3. The mixture is cooled at 2° C. and 2 cm.³ of an aqueous solution containing 2% of osmium tetroxide are added followed, over the course of 2 minutes, by 1.6 g. of sodium metaperiodate dissolved in 10 cm.³ of water. The mixture is kept at 2° C. for 4 hours with stirring, and 25 cm.³ of 2.5 N sodium hydroxide solution are then added. After the treatments described in Example 2, 0.31 g. of canthaxanthine, M.P. 220° C., are obtained.

EXAMPLE 5

1 g. of β-carotene and 175 cm.³ of chloroform containing 0.5% by volume of ethanol are introduced into the apparatus described in Example 3. The mixture is cooled to 2° C., and 1.6 g. of sodium metaperiodate dissolved in 12 cm.³ of water, and 0.04 g. of vanadium pentoxide are added all at once. After 3 hours stirring at 2° C., 25 cm.³ of 2.5 N sodium hydroxide solution are added, and by working thereafter as in Example 2, 0.21 g. of canthaxanthine, M.P. 220° C., are obtained.

EXAMPLE 6

1 g. of β-carotene, 180 cm.³ of chloroform containing 0.5% by volume of ethanol, 1.6 g. of sodium metaperiodate dissolved in 12 cm.³ of water and 0.08 g. of tungsten trioxide are introduced into the apparatus described in Example 3. The mixture is stirred for 15 hours at 20° C., and 25 cm.³ of 2.5 N sodium hydroxide are then added. By working thereafter as in Example 2, 0.205 g. of canthaxanthine are obtained, M.P. 221° C.

EXAMPLE 7

The procedure of Example 3 is followed, replacing the bromine solution by 2 cm.³ of a 1.2% strength aqueous solution of sodium iodide. The mixture is stirred for 1 hour 30 minutes after adding the metaperiodate, and 25 cm.³ of 2.5 N sodium hydroxide solution are then added. 0.20 g. of canthaxanthine, M.P. 218° C., are obtained. On again allowing the mother liquor to stand at 0° C., a further 0.17 g. of less pure canthaxanthine, M.P. 199° C., are obtained.

I claim:

1. Process for the preparation of canthaxanthine which comprises contacting at −5° to +25° C. and in an inert diluent which can be removed at a temperature below 60° C. β-carotene or retrodehydro-β-carotene with ammonium or an alkali metal metaperiodate in a proportion of at least 4 molecules of metaperiodate per molecule of β-carotene or retrodehydro-β-carotene in the presence of, as catalyst, an oxide of a metal of Group V–A, VI–A, VII–A or VIII of the Periodic Table, the reaction being continued until no β-carotene or retrodehydro-β-carotene is detectable in the reaction mixture, 2. Process according to claim 1 in which the catalyst is osmium tetroxide, vanadium pentoxide, molybdenum trioxide, or tungsten trioxide.

3. Process according to claim 1 in which the proportion of catalyst is from 0.1 to 10% by weight of the β-carotene or retrodehydro-β-carotene.

4. Process according to claim 3 in which the said proportion is 0.5 to 5% by weight.

5. Process according to claim 1 in which the initial concentration of the β-carotene or retrodehydro-β-carotene is from 0.1 to 3% of the reaction medium, expressed in weight for volume.

6. Process according to claim 5 in which the said concentration is from 0.4 to 0.9% weight for volume.

7. Process according to claim 1 in which the oxidation is effected in the presence of up to 2%, by volume of the reaction medium, of a lower alkanol.

8. Process according to claim 1 in which the oxidation is effected at 0° to +5° C.

9. Process according to claim 1 in which the metaperiodate is dissolved in water and the β-carotene or retrodehydro-β-carotene in an inert, organic, water-immissible solvent.

References Cited
UNITED STATES PATENTS
2,870,197  1/1959  Isler et al. _____ 260—586 R X
2,871,267  1/1959  Petracek et al. _____ 260—586 R LEON ZITVER, Primary Examiner N. MORGENSTERN, Assistant Examiner

UNITED STATES PATENT OFFICE
CERTIFICATE OF CORRECTION

Patent No. 3,790,635          Dated February 5, 1974

Inventor(s) Jacques Morel

It is certified that error appears in the above-identified patent and that said Letters Patent are hereby corrected as shown below:

Column 1, in the heading insert the following:

--Claims priority, application France 119,189 filed August 28, 1967-

Signed and sealed this 30th day of July 1974.

(SEAL)
Attest:

McCOY M. GIBSON, JR.
Attesting Officer

C. MARSHALL DANN
Commissioner of Patents